Oct. 6, 1931.         J. A. BUTKUS         1,826,420
FURNITURE CORNER CONSTRUCTION
Filed Aug. 24, 1927     3 Sheets-Sheet 1
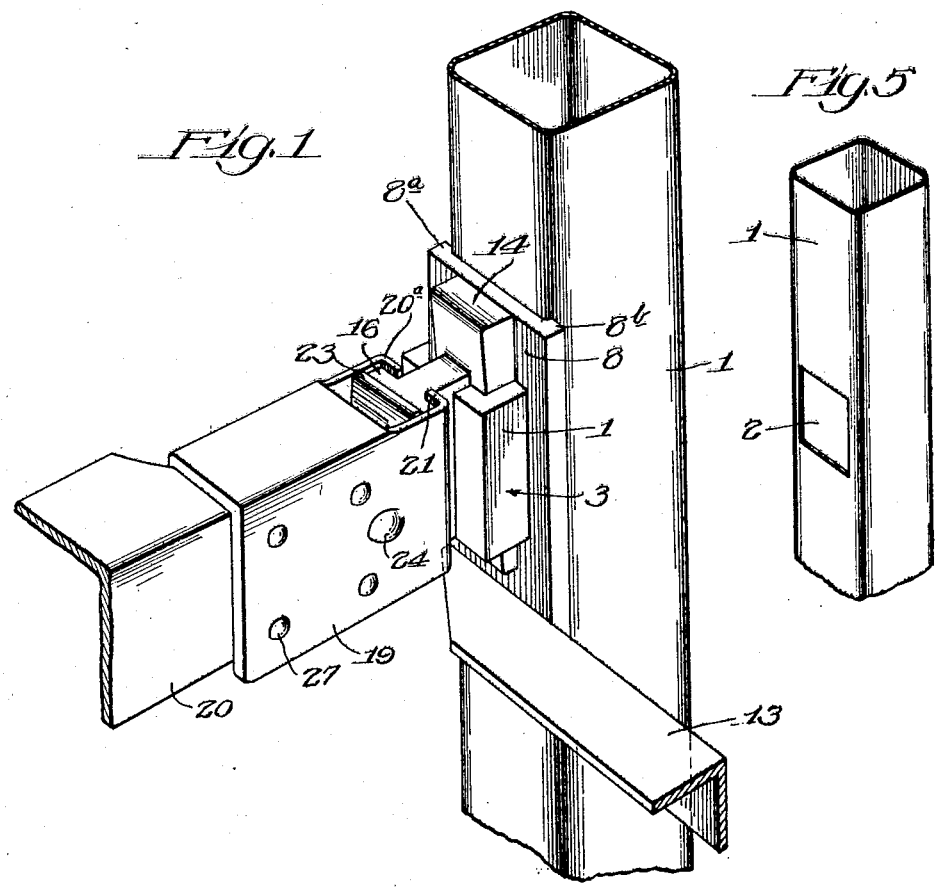
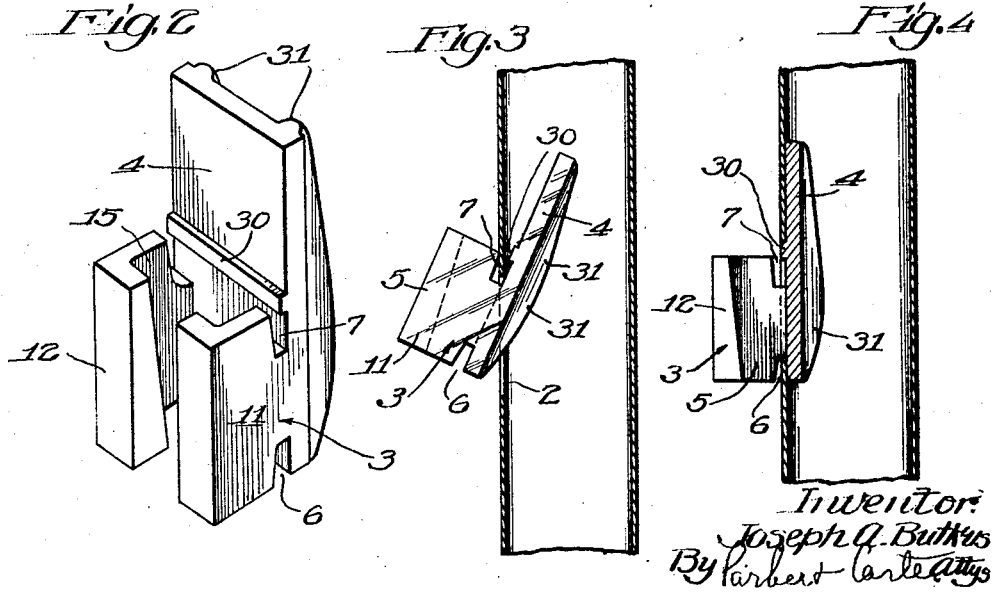
Inventor:
Joseph A. Butkus
By Herbert Carter Attys Oct. 6, 1931. J. A. BUTKUS 1,826,420
FURNITURE CORNER CONSTRUCTION
Filed Aug. 24, 1927 3 Sheets-Sheet 2
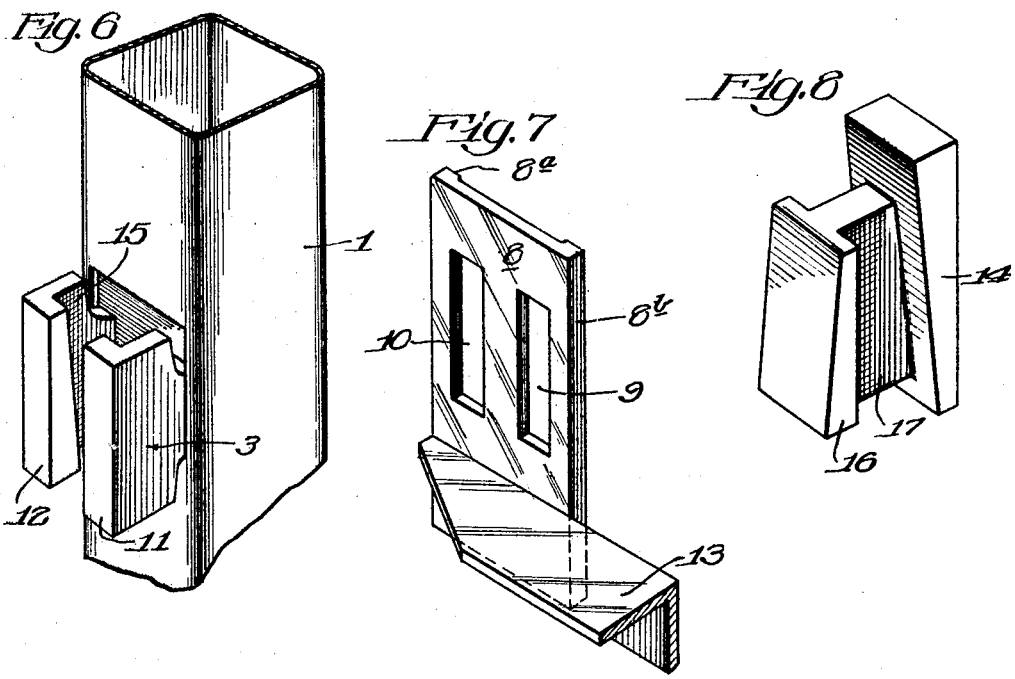
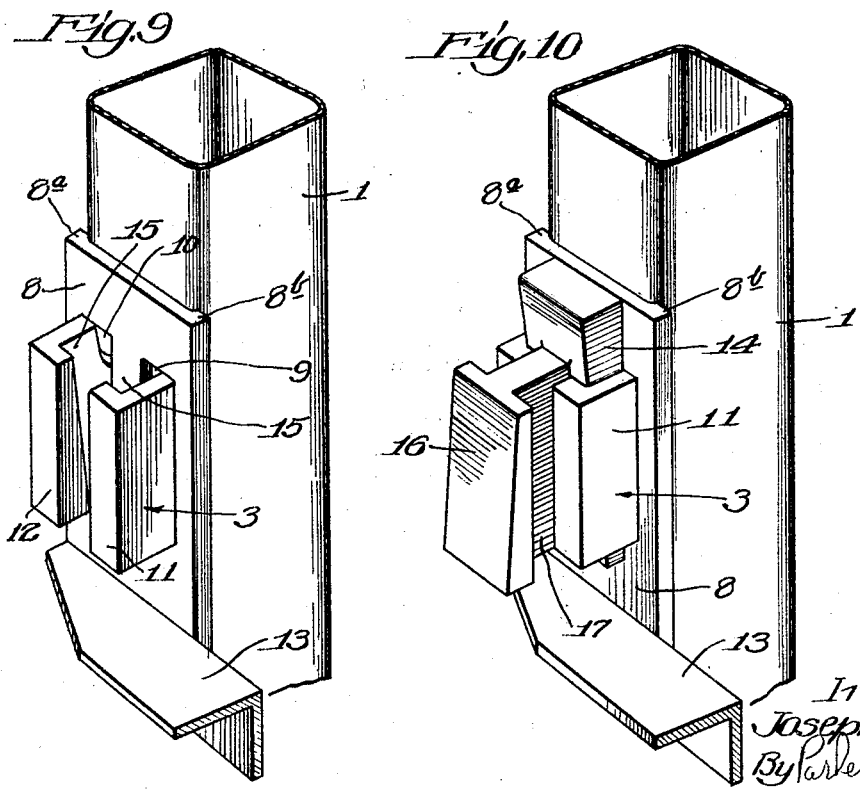

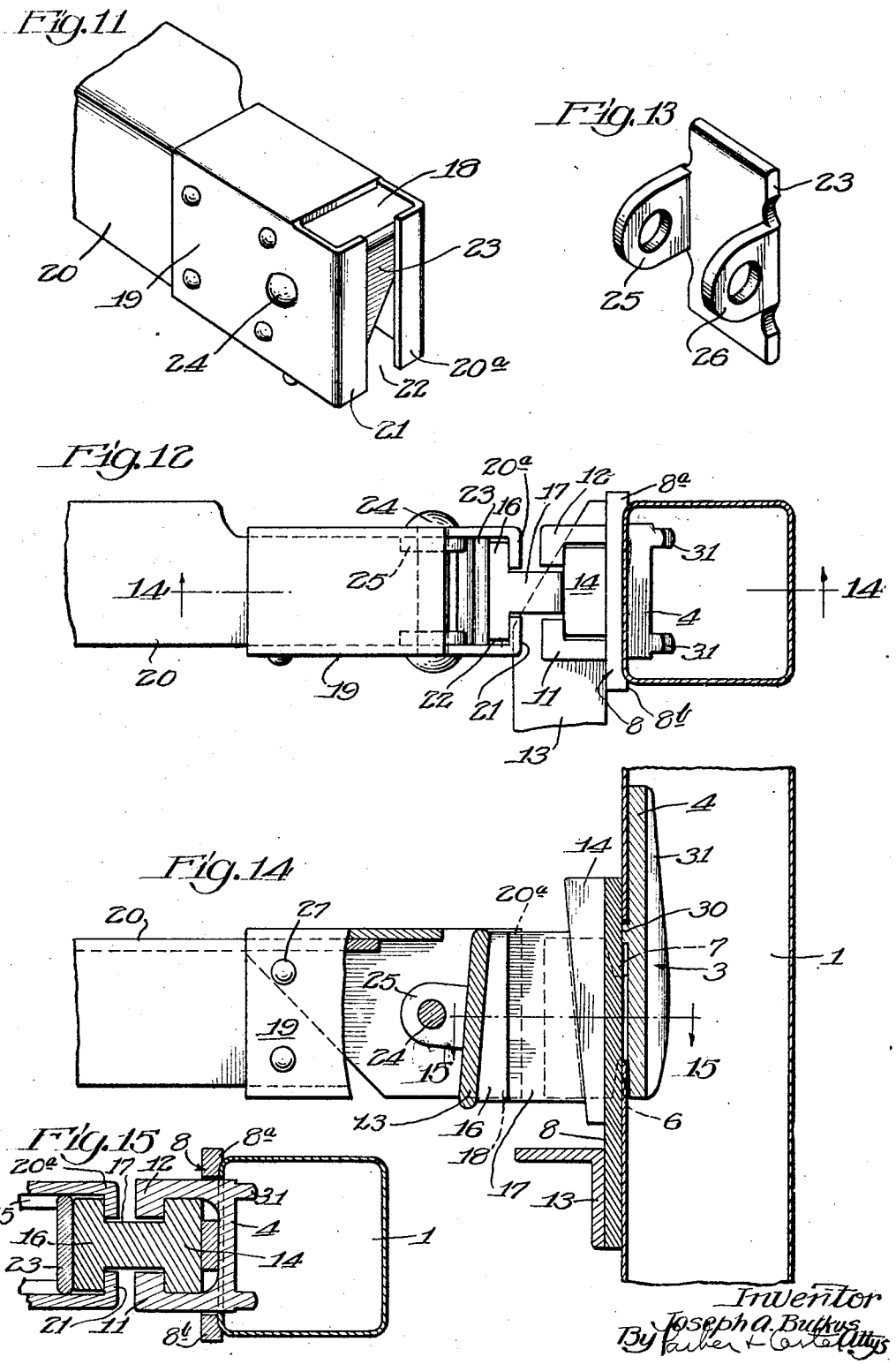

Patented Oct. 6, 1931

1,826,420

UNITED STATES PATENT OFFICE

JOSEPH A. BUTKUS, OF CHICAGO, ILLINOIS, ASSIGNOR TO GUSTAVUS A. E. KOHLER, OF CHICAGO, ILLINOIS

FURNITURE CORNER CONSTRUCTION

Application filed August 24, 1927. Serial No. 215,077.

This invention relates to improvements in furniture corner construction and has for its object to provide a new and improved construction of this description.

The invention has as a further object to provide corner construction for furniture by means of which the structure can be assembled and disassembled from the outside and without the necessity of inserting any of the parts in the ends of the corner supports.

The invention has as a further object to provide a strong, durable and cheap corner construction by means of which the structure may be easily and quickly assembled and disassembled.

The invention has further objects which are more particularly pointed out in the following description.

Referring now to the drawings, Fig. 1 is a perspective view of one form of the device embodying the invention.

Fig. 2 is an enlarged perspective view of the support connecting member.

Fig. 3 is a longitudinal, sectional view through a portion of the support showing the method of connecting the supporting connecting member therewith.

Fig. 4 is a view similar to Fig. 3 showing the support connecting member in position.

Fig. 5 is a perspective view of the support.

Fig. 6 is a perspective view of the support connecting member in position.

Fig. 7 is a perspective view of the front plate which acts as the cross rail connecting member.

Fig. 8 is a perspective view of the connecting wedge.

Fig. 9 is a perspective view showing the support, front plate and support connecting member in position.

Fig. 10 is a view similar to Fig. 9 with the connecting wedge in position.

Fig. 11 is a perspective view of the rail connecting member.

Fig. 12 is a plan view of the construction shown in Fig. 1.

Fig. 13 is a perspective view of the clamping device of the rail connecting member.

Fig. 14 is a sectional view taken on line 14—14 of Fig. 12.

Fig. 15 is a sectional view taken on line 15—15 of Fig. 14.

Like numerals refer to like parts throughout the several figures.

Referring now to the drawings, I have shown a support 1 which, in the construction illustrated, is the corner support of a piece of furniture such as a bed. This support is preferably hollow and is provided with an opening 2. A removable connecting member 3 is removably connected with the support. This connecting member has the inner piece 4 adapted to be inserted in the opening 2 and to engage the inner face of the support. Connected with the inner piece is the wedge holding piece 5.

Notches 6 and 7 are provided in the member 3 to facilitate the insertion of the inner piece 4 through the opening 2. This inner piece is inserted as shown in Fig. 3, the portion of the support at the upper edge of the opening entering the notch 7 as shown. The notch 7 is of such depth that the distance from the bottom of the notch to the bottom of the connecting piece is equal to or less than the height of the opening 2 so that when the connecting member is in the position shown in Fig. 3, it may then be moved inwardly and lowered. The portion of the support at the bottom of the opening 2 then enters the notch 6, the parts taking the position shown in Fig. 4.

A cross bar connecting member is provided which is shown as a removable front plate 8 and is provided with openings 9 and 10 for the branches 11 and 12 of the support connecting member and is placed in position as shown in Fig. 9. This plate has the cross bar 13 connected therewith, as shown in Fig. 7. The front plate 8 is preferably provided with the projecting edges 8a and 8b which project around the corners of the support as shown in Figs. 12 and 15 so as to strengthen the construction.

A removable connecting wedge member is provided having the wedge piece 14 which is received into the wedge shaped space 15 in the support connecting member 3. This connecting wedge member is provided with a second wedge piece 16, the two wedge pieces being connected together by the reduced portion 17. The wedge piece 16 fits into a wedge shaped opening 18 in the rail connecting member 19 connected with the rail 20 extending to another corner of the device. This rail connecting member is preferably made of sheet metal formed by stamping by means of dies. The ends 20 and 21 of the rail connecting member are bent around as shown to provide a slot 22 for the reduced portion 17 of the connecting wedge member.

A clamping device 23 is pivotally connected with the rail connecting member 19 by the pivot 24 which passes through the lugs 25 and 26. This clamping device engages the face of the wedge piece 16, as clearly shown in Fig. 14, and automatically aligns itself to the taper of the wedge piece without any accurate mechanical fitting. When the wedge piece, for example, is cast, it is more or less rough and to finish it would be expensive. With this construction, no finishing is necessary due to the fact that the clamping device thus automatically aligns itself with relation to the wedge and permits the wedge to take the proper position even when rough and unfinished. This is an important factor in the use of the device. The support 1 may have its corners rounded, as shown in Figs. 1 and 12. When these corners are rounded, I prefer to arrange the plate 8 with projecting edges 8a, as shown. These edges hold the plate against twisting when the parts are in position. I also prefer to provide the support connecting member with a stop lug 30 which is moved into engagement with the edge of the support, as shown in Fig. 4 and which holds the support connecting member against upward movement giving a stronger and more rigid construction.

The support connecting member is also preferably provided with strengthening ribs 31. The fastening devices in all cases may be any suitable kind such as rivets, screws or the like. The rail connecting member 19 is connected with the rail 20 in any desired manner as by means of the screws or rivets 27.

The use and operation of my invention are as follows:

When it is desired to assemble the parts, the support connecting member 3 is inserted in the support 1 in the manner illustrated in Fig. 3. The front plate 8 is then placed in position as illustrated in Fig. 9. The wedge piece 14 of the connecting wedge member is then placed in the wedge shaped opening 15 of the support connecting member 3, as shown in Fig. 10. The wedge piece 16 is then placed in the opening 18 of the rail connecting member 19 and the parts are then completely assembled as illustrated in Figs. 1, 12, and 14. The connecting wedge member and associated clamping member cause the parts to be entirely clamped together so that they will be held in proper relation.

This construction also prevents the parts from being disassembled or disarranged when the weight is placed upon the rail 20, such weight insuring a tighter connection between the parts. When the device is used in connection with beds, the rail is usually an angle iron. In some cases it is deirable to reverse this rail from the position shown in Fig. 1 where one of the members of the angle iron forms a flat top, to the position where this member is at the bottom and the other member forms the outer edge. The springs now used for metal beds are arranged so that they can be supported upon the flat top of the rail when it is in the position shown in Fig. 1. Springs for wooden beds, however, are not so arranged and one reason for reversing the rail is to adapt it to support springs made for wooden beds.

I claim:

1. A furniture corner construction comprising a hollow support having an opening in one side thereof, a support connecting member having an inside piece adapted to be inserted into the support through said opening, said member being provided with two projecting engaging parts which project on the exterior of said support, said parts being separated at the top and bottom from the body portion of said member by slots, a connecting wedge member adapted to be inserted between said projecting parts, the wedge and projecting parts having engaging inclined faces, and a crossbar connecting member supported by said support connecting member and held against outward movement by said connecting wedge member.

2. A furniture corner construction comprising a hollow support having an opening in one side thereof, a support connecting member having an inside piece adapted to be inserted into the support through said opening, said member being provided with two projecting engaging parts which project on the exterior of said support, said parts being separated at the top and bottom from the body portion of said member by slots, a connecting wedge member adapted to be inserted between said projecting parts, the wedge and projecting parts having engaging inclined faces, a rail connecting member connected with said rail having a slot at its front end, and a clamping device connected with said rail connecting member, a part of said connecting wedge member received between said clamping device and the front end of said rail connecting member, said clamping device being pivotally connected with said rail connecting member.

3. A furniture corner construction comprising a hollow support having an opening at one side thereof, a support connecting member having an inner piece which engages the inner face of said support, and a wedge holding device projecting from said support, a connecting wedge member having two wedge pieces, one of said wedge pieces being removably connected with said wedge holding piece of the support connecting member, and a rail connecting member with which the other wedge piece is removably connected, said rail connecting member having a clamping device connected therewith which engages said last mentioned wedge member, said clamping device pivotally connected with said rail connecting member.

4. A furniture corner construction comprising a hollow support having an opening at one side thereof, a support connecting member having an inner piece which engages the inner face of said support, and a wedge holding device projecting from said support, a connecting wedge member having two wedge pieces, one of said wedge pieces being removably connected with said wedge holding piece of the support connecting member, a rail connecting member with which the other wedge piece is removably connected, and a cross-bar supporting member supported by said support connecting member, said cross-bar supporting member comprising a plate through which a portion of said support connecting member projects, said connecting wedge member engaging said plate.

5. A furniture corner construction comprising a hollow support, a support connecting member removably connected therewith, said support connecting member having two separated projecting parts, a crossbar supporting member having a plate with openings therein through which said projecting members pass, and a wedge device engaging said projecting parts and said plate.

Signed at Chicago, county of Cook, and State of Illinois, this 28th day of May, 1927.

JOSEPH A. BUTKUS.